US008135530B2

(12) United States Patent
Ueoka et al.

(10) Patent No.: US 8,135,530 B2
(45) Date of Patent: Mar. 13, 2012

(54) VEHICULAR CONTROL DEVICE, METHOD OF CONTROLLING A VEHICLE, AND STORAGE MEDIUM HAVING STORED THEREIN A PROGRAM THAT IMPLEMENTS THE METHOD

(75) Inventors: Kiyoshiro Ueoka, Nisshin (JP); Yu Nakao, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 442 days.

(21) Appl. No.: 12/522,224

(22) PCT Filed: Nov. 7, 2007

(86) PCT No.: PCT/JP2007/072060
§ 371 (c)(1),
(2), (4) Date: Jul. 6, 2009

(87) PCT Pub. No.: WO2008/087789
PCT Pub. Date: Jul. 24, 2008

(65) Prior Publication Data
US 2010/0076661 A1   Mar. 25, 2010

(30) Foreign Application Priority Data

Jan. 17, 2007   (JP) .................................. 2007-008108

(51) Int. Cl.
*B60T 7/12* (2006.01)
*B60L 9/18* (2006.01)
*G06F 19/00* (2006.01)

(52) U.S. Cl. ........................ 701/84; 701/70; 303/116.1
(58) Field of Classification Search ................... 701/84, 701/70, 78; 303/122.06, 125, 116.1, 192
See application file for complete search history.

(56) References Cited

U.S. PATENT DOCUMENTS

| 5,931,545 | A  | * | 8/1999  | Yonemura et al. | ............. 303/125  |
| 6,120,110 | A  | * | 9/2000  | Shimizu         | ...................... 303/113.4 |
| 7,837,281 | B2 | * | 11/2010 | Kamikado        | ....................... 303/191 |
| 2004/0012250 | A1 | | 1/2004 | Kuno et al. | |
| 2004/0215385 | A1 | | 10/2004 | Aizawa et al. | |

FOREIGN PATENT DOCUMENTS

| JP | 9-130909 A   | 5/1997  |
| JP | 10-329671 A  | 12/1998 |
| JP | 2003-182404 A | 7/2003  |
| JP | 2004-90679 A  | 3/2004  |
| JP | 2006-232014 A | 9/2006  |

* cited by examiner

*Primary Examiner* — Tan Q Nguyen
(74) *Attorney, Agent, or Firm* — Kenyon & Kenyon LLP

(57) ABSTRACT

An ECU executes a program including the steps of: if brake hold control is currently exerted, setting at zero a controlled value of a degree of operation of an accelerator pedal used as a controlled value of a degree of a request made by a driver for acceleration, to control a force output to drive the vehicle; if an actual value of the degree of operation of the accelerator pedal serving as an actual value of the degree of the request made by the driver for acceleration is larger than a predetermined degree, determining that there is a request from the driver for acceleration; outputting a command to cancel the brake hold control; and converging the controlled value of the degree of operation of the accelerator pedal to the actual value of the degree of operation of the accelerator pedal.

19 Claims, 9 Drawing Sheets

VEHICULAR CONTROL DEVICE, METHOD OF CONTROLLING A VEHICLE, AND STORAGE MEDIUM HAVING STORED THEREIN A PROGRAM THAT IMPLEMENTS THE METHOD

This is a 371 national phase application of PCT/JP2007/072060 filed 7 Nov. 2007, claiming priority to Japanese Patent Application No. 2007-008108 filed 17 Jan. 2007, the contents of which are incorporated herein by reference.

TECHNICAL FIELD

The present invention relates generally to controlling vehicles subjected to brake hold control, and particularly to controlling vehicles in which the brake hold control is cancelled once a degree of operation of an accelerator pedal has attained a predetermined value.

BACKGROUND ART

In recent years a vehicle including an automatic transmission is known that reduces a burden on a driver operating a brake in a traffic jam and the like. More specifically, when the vehicle is stopped in a forward position and in that condition once the vehicle has the brake pedal operated to a degree (e.g., in an amount) larger than a predetermined degree, then thereafter even if the brake pedal is not operated the braking force applied when the vehicle is stopped is held (i.e., brake hold control is exerted). In starting a vehicle subjected to the brake hold control, when the driver releases his/her foot from the brake pedal, a force applied to brake the vehicle when the vehicle is stopped is held. Furthermore, the vehicle subjected to the brake hold control is adapted such that when the driver operates the accelerator pedal the brake hold control can be cancelled to start the vehicle. Thus in starting the vehicle on an uphill road when the driver releases his/her foot from the brake pedal the vehicle does not reverse and is thus readily started. In starting the vehicle on a downhill road, when the accelerator pedal is pressed the brake hold control is cancelled, and the acceleration attributed to the engine and that attributed to the downhill road are simultaneously exerted and the vehicle may suddenly start. To resolve this problem, for example Japanese Patent Laying-Open No. 10-329671 discloses a technique.

Japanese Patent Laying-Open No. 10-329671 discloses a brake control system including a brake hold function. More specifically, when a vehicle is stopped and the driver releases his/her foot from the brake pedal, the function holds a braking pressure applied from a master cylinder linked with the brake pedal. The brake control system includes a gradient determination unit determining a gradient of a road at least from a degree of operation of an accelerator pedal of the vehicle, and a control unit exerting control to release the held braking pressure if the road's gradient is a downhill gradient.

According to Japanese Patent Laying-Open No. 10-329671, the brake control system allows a road's gradient to be determined at least from a degree of operation of an accelerator pedal and if the gradient is a downhill gradient a held braking pressure is released. Thus in starting the vehicle on a downhill road the held braking pressure has been released. The acceleration attributed to the engine and that attributed to the downhill road are not simultaneously exerted and the vehicle can avoid suddenly starting.

For example, to detect a driver's request for acceleration more precisely, a degree of operation of an accelerator pedal that has attained a predetermined value, rather than the accelerator pedal being simply operated, may be considered as the driver's request for acceleration and the brake hold control may accordingly be cancelled. However, when the brake hold control is cancelled, and if at that time a driving force having a magnitude corresponding to the degree of operation of the accelerator pedal that has the predetermined value has been output, the vehicle may suddenly start.

However, Japanese Patent Laying-Open No. 10-329671 is silent on how the brake control system operates for canceling brake hold control when a degree of operation of the accelerator pedal attains the predetermined value.

DISCLOSURE OF THE INVENTION

The present invention has been made to overcome the above disadvantage, and it contemplates a vehicular control device, a method of controlling a vehicle, and a storage medium having stored therein a program that implements the method, that can reduce wasteful energy consumption in a vehicle for which brake hold control is cancelled in accordance with a degree of a request made by a driver for acceleration and that can also prevent the vehicle from suddenly starting when the brake hold control is cancelled.

The present control device controls a vehicle. The vehicle is subjected to brake hold control controlling a braking device to hold a force braking the vehicle, as based on a state of the vehicle, while the driver of the vehicle does not press a brake pedal. The brake hold control is stopped when a first degree detected as an actual value of a degree of a request made by the driver for acceleration exceeds a predetermined degree. The control device comprises: a detection unit for detecting the first degree; a degree setting unit for setting a second degree used as a controlled value of the degree of the request made by the driver for acceleration, to control a force output to drive the vehicle; and a control unit for controlling the force output to drive the vehicle, as based on the second degree. The degree setting unit includes a determination unit for determining whether the first degree is larger than the predetermined degree while the brake hold control is exerted, a setting unit for setting the second degree to be smaller than the first degree until a decision is made that the first degree is larger than the predetermined degree, and an increasing unit for increasing the second degree to gradually approach the first degree when a decision is made that the first degree is larger than the predetermined degree.

According to the present invention, brake hold control is stopped when a first degree detected as an actual value of a degree of a request made by a driver for acceleration (e.g., an actual value of a degree of operation of an accelerator pedal) exceeds a predetermined degree. Until a decision is made that the first degree is larger than the predetermined degree, a second degree used as a controlled value of the degree of the request made by the driver for acceleration, to control a force output to drive the vehicle (e.g., a controlled value of the degree of operation of the accelerator pedal) is set to be smaller than the first degree (e.g., approximately at zero). This can reduce wasteful energy consumption to be smaller than exerting the brake hold control, with the second degree set at the same value as the first degree, and thus outputting a driving force. When a decision is made that the first degree is larger than the predetermined degree, the second degree is increased to gradually approach the first degree. This allows a driving force to be increased more gradually than setting the second degree to the same value as the first degree immediately after the first degree is larger than the predetermined degree, and the vehicle can be prevented from suddenly starting. As a result, a control device can be provided that allows a vehicle for which brake hold control is cancelled based on a degree of a request from a driver for acceleration to reduce wasteful energy consumption and that can also prevent the vehicle from suddenly starting when the brake hold control is cancelled.

Preferably, the increasing unit increases the second degree based on a difference between the first degree and the second degree.

According to the present invention, a difference between the first degree and the second degree can be said to be a difference between a driving force corresponding to the driver's request for acceleration and an actual driving force. Accordingly, the second degree is increased based on the difference between the first degree and the second degree. The actual driving force can thus be increased based on the difference between the driving force corresponding to the driver's request for acceleration and the actual driving force.

Still preferably, the increasing unit increases the second degree at a rate allowing an amount increased for a predetermined time to be equal to the difference that is provided when the brake hold control is stopped.

According to the present invention, the second degree is increased at a rate allowing an amount increased for a predetermined time to be equal to the difference that is provided when the brake hold control is stopped. Accordingly, a driving force can be increased gradually at a constant rate by adjusting the predetermined period of time.

Still preferably, the increasing unit increases the second degree by a larger amount for the difference that is larger.

According to the present invention, it can be said that when the first degree has larger differences from the second degree, the driving force corresponding to the driver's request for acceleration has larger differences from the actual driving force. Accordingly, when the first degree has larger differences from the second degree, the second degree is increased by a larger amount. Thus when the first degree has larger differences from the second degree, the second degree can be converged to the first degree in smaller periods of time to faster output a driving force corresponding to the driver's request for acceleration.

Still preferably, the increasing unit increases the second degree based on the first degree.

According to the present invention, the second degree is increased based on the first degree. An actual driving force can thus be increased based on a degree of a request made by the driver for acceleration.

Still preferably, the increasing unit increases the second degree by a larger amount for the first degree that is larger.

According to the present invention, the second degree is increased by a larger amount for the first degree that is larger. Thus, for the driver's request for larger acceleration, the second degree can be converged to the first degree in a smaller period of time to faster output a driving force corresponding to the driver's request for larger acceleration.

BEST MODES FOR CARRYING OUT THE INVENTION

Figure 1:
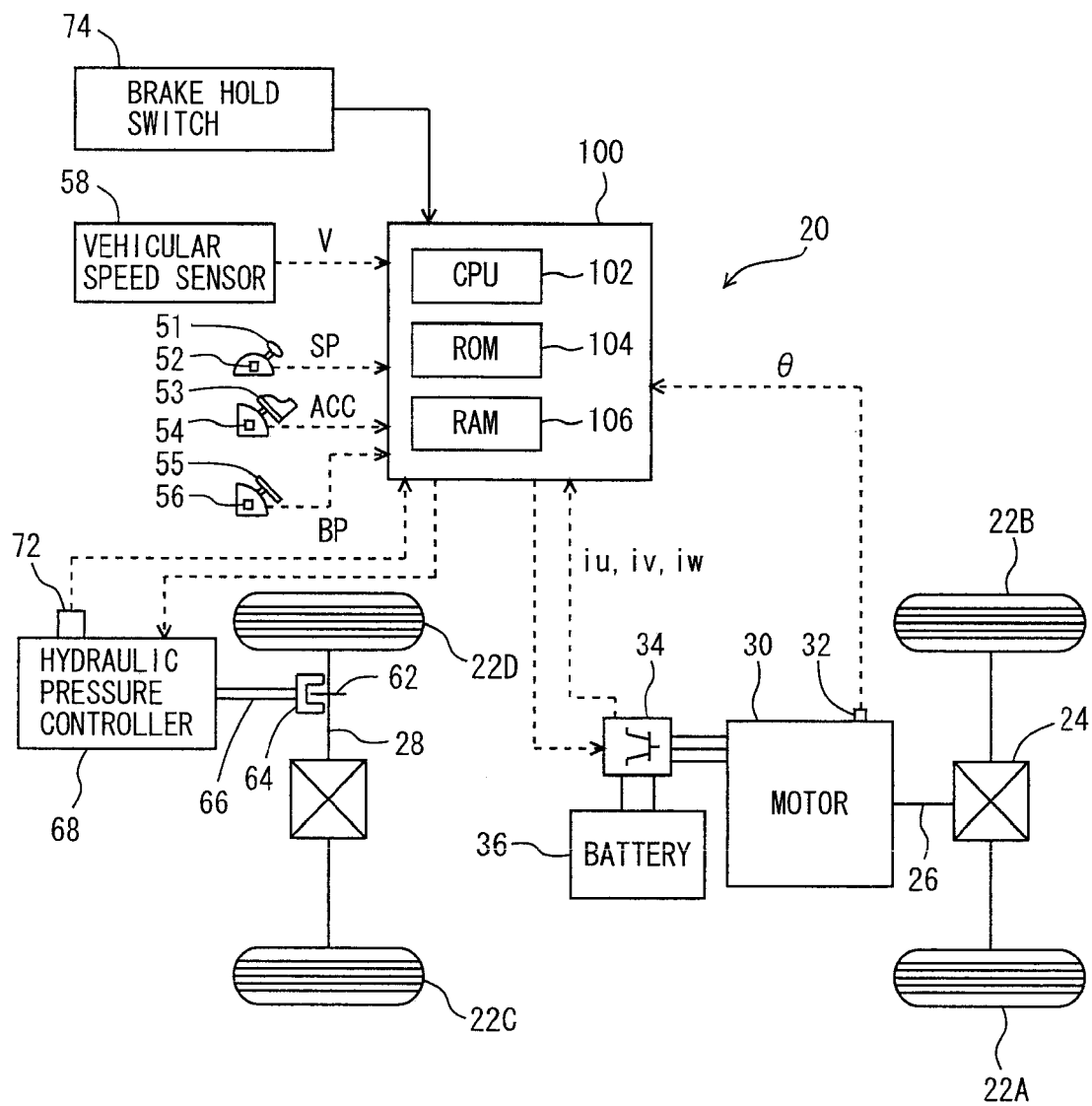
FIG. 1 shows a configuration of a vehicle having mounted therein a control device of the present invention in the first embodiment.

Hereinafter reference will be made to the drawings to describe the present invention in embodiments. In the following description, identical components are denoted by identical reference characters. Their names and functions are also identical. Accordingly, they will not be described repeatedly in detail.

First Embodiment

With reference to FIG. 1, the present embodiment provides a control device mounted in an electric vehicle 20 configured as will be described hereinafter. The present control device is not only applicable to the FIG. 1 electric vehicle: it is applicable to an electric vehicle having a different manner. Furthermore, the vehicle may not be an electric vehicle: it may be a hybrid vehicle traveling by the motive power of an engine and a motor.

Electric vehicle 20 includes wheels 22A, 22B, 22C, 22D, a propeller shaft 26 connected to wheels 22A, 22B via a differential gear 24, a motor 30 outputting motive power to propeller shaft 26 for driving the wheels for traveling, a battery 36 supplying motor 30 with electric power via an inverter 34, and an electronic control unit (ECU) 100 generally controlling electric vehicle 20.

Motor 30 is configured for example as a well known, permanent magnetic (PM) type, synchronous motor generator and driven by 3-phase alternate current electric power received from inverter 34.

Inverter 34 is configured as a well known inverter circuit having 6 switching elements, and receives direct current electric power from battery 36 and supplies it for example by pulse width modulation (PWM) control as pseudo 3-phase alternate current electric power to motor 30.

ECU 100 is configured as a microprocessor with a central processing unit (CPU) 102 serving as a center, and has other than CPU 102 a read only memory (ROM) 104 storing a processing program, a random access memory (RAM) 106 temporarily storing data, and an input/output port (not shown).

Electric vehicle 20 further includes a brake disk 62 provided at a drive shaft 28 connected to wheel 22D, a brake mechanism 64, a brake pipe 66, and a hydraulic pressure controller 68. Note that brake disk 62, brake mechanism 64 and brake pipe 66 may be provided for each wheel 22A, 22B, 22C, 22D.

Brake mechanism 64 receives the pressure of a brake fluid introduced into brake pipe 66 and in accordance with the brake fluid's pressure received sandwiches brake disk 62 to generate frictional braking force (hydraulic brake). The brake fluid's pressure in brake pipe 66 is adjusted by hydraulic pressure controller 68. Hydraulic pressure controller 68 receives a brake control signal from ECU 100 and outputs the brake fluid's pressure to brake pipe 66 in accordance with the brake control signal.

ECU 100 receives: a detection signal θ from a rotational position detection sensor 32 detecting a rotational position of a rotor of motor 30; phase currents iu, iv, iw from a current sensor (not shown) attached to each phase of inverter 34; a shift position SP from a shift position sensor 52 detecting a position at which a shift lever 51 is operated; an actual value of a degree of operation of an accelerator pedal from an accelerator pedal position sensor 54 detecting an amount by which accelerator pedal 53 is operated; an amount by which brake pedal 55 is operated BP from a brake pedal position sensor 56 detecting the amount by which the brake pedal is operated; vehicular speed V from a vehicular speed sensor 58; and the like through an input port.

Accelerator pedal position sensor 54 detects as a degree of a request made by a driver for acceleration an actual value of a degree of operation of the accelerator pedal, and accelerator pedal position sensor 54 transmits to ECU 100 a signal representing a result of the detection. An actual value of a degree of operation of the accelerator pedal, as referred to herein, means a ratio of a current amount of operation of accelerator pedal 53 relative to a maximum amount of operation of accelerator pedal 53. The present invention is not limited to that accelerator pedal position sensor 54 detects an actual value of a degree of operation of the accelerator pedal. For example, accelerator pedal position sensor 54 may detect a current amount of operation of accelerator pedal 53, and ECU 100 may detect an actual value of a degree of operation of the accelerator pedal.

Figure 2:
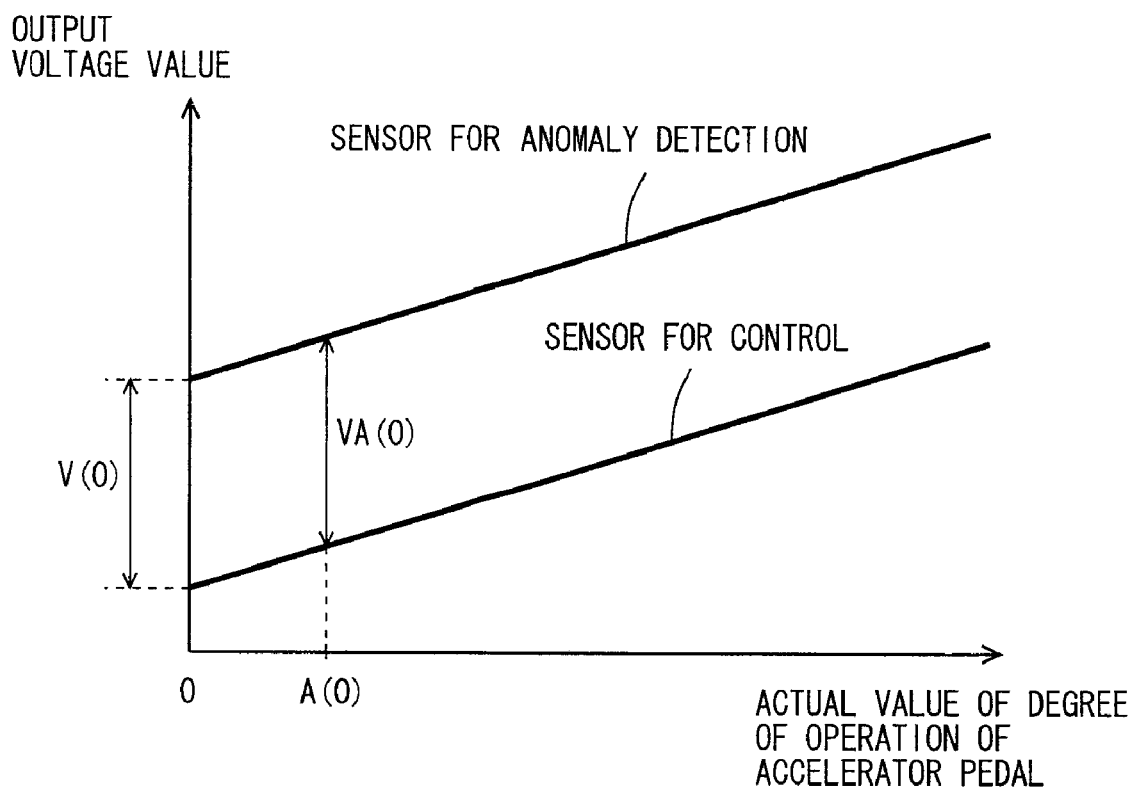
FIG. 2 represents a characteristic of an output of an accelerator pedal position sensor.

Accelerator pedal position sensor 54 includes two position sensors (not shown), i.e., a sensor for control and a sensor for anomaly detection, to ensure reliability for detection. The sensor for control and the sensor for anomaly detection have different output characteristics, as shown in FIG. 2. The sensor for control and the sensor for anomaly detection have their respective output voltage values with a difference of V(0) for an actual value of a degree of operation of the accelerator pedal of zero. When the sensor for control and the sensor for anomaly detection normally function, and an actual value of a degree of operation of the accelerator pedal increases, the sensor for control and the sensor for anomaly detection have their respective output voltage values having a characteristic increasing the values at the same rate. Their respective output voltage values thus have a difference held at V(0). This characteristic is utilized to allow accelerator pedal position sensor 54 to monitor a voltage difference VA(0) for an actual value of a degree of operation of the accelerator pedal of a degree A(0), and if voltage difference VA(0) is maintained at V(0), a decision is made that accelerator pedal position sensor 54 normally functions. In other words, to ensure the driver's request for acceleration in reliability, it is necessary that an actual value of a degree of operation of the accelerator pedal be larger than degree A(0) as predetermined.

Furthermore, ECU 100 receives signals from a brake fluid pressure sensor 72 and a brake hold switch 74 via an input port.

Brake fluid pressure sensor 72 detects the brake fluid's pressure in brake pipe 66 that is adjusted by hydraulic pressure controller 68, and brake fluid pressure sensor 72 transmits to ECU 100 a signal representing a result of detecting the pressure.

Brake hold switch 74 is operated by a driver to select whether the driver desires to exert brake hold control, as will be described later. If brake hold switch 74 is turned on, brake hold switch 74 transmits to ECU 100 a signal representing that the driver desires to exert the brake hold control. If brake hold switch 74 is turned off, brake hold switch 74 transmits to ECU 100 a signal representing that the driver does not desire to exert the brake hold control.

ECU 100 sets a controlled value of a degree of operation of the accelerator pedal based on an actual value of the degree of operation of the accelerator pedal and the vehicle's condition. The controlled value of the degree of operation of the accelerator pedal is used as a controlled value of a degree of a request made by a driver for acceleration, to control a force output to drive the vehicle. When ECU 100 causes electric vehicle 20 to run, ECU 100 controls motor 30 to drive motor 30 to cause motor 30 to output a requested torque set based on a controlled value of a degree of operation of the accelerator pedal and vehicular speed V. In other words, in controlling a force output to drive electric vehicle 20, an actual value of a degree of operation of the accelerator pedal is not used directly. Rather, a controlled value of the degree of operation of the accelerator pedal that is set by ECU 100 in accordance with the actual value of the degree of operation of the accelerator pedal, is used.

When ECU 100 brakes electric vehicle 20, ECU 100 controls motor 30 to drive motor 30 to cause motor 30 to output a braking torque set as based on the amount by which the brake pedal is operated BP and vehicular speed V.

To allow motor 30 to receive a motor current generating the above requested torque and braking torque, ECU 100 generates a switching control signal controlling a switching element that configures inverter 34 to turn on/off. Inverter 34 performs electric power conversion in response to the switching control signal to supply motor 30 with alternate current electric power.

Furthermore, when brake hold switch 74 is turned on, ECU 100 exerts the brake hold control to alleviate a burden imposed on the driver's braking operation in a traffic jam or the like. More specifically, ECU 100 detects shift position SP, vehicular speed V, an actual value of a degree of operation of the accelerator pedal, and the amount by which the brake pedal is operated BP. If shift position SP is a forward position (a D position), the actual value of the degree of operation of the accelerator pedal is approximately zero, vehicular speed V is approximately zero (i.e., the vehicle is currently stopped) and once the amount by which the brake pedal is operated BP has exceeded a predetermined threshold value, then ECU 100 exerts control such that the braking force applied when the vehicle is stopped is held even if the amount by which the brake pedal is operated BP is reduced after amount BP has exceeded the predetermined threshold value.

When accelerator pedal 53 is operated and the actual value of the degree of operation of the accelerator pedal exceeds predetermined degree A(0) as aforementioned (i.e., the driver's request for acceleration is ensured in reliability), ECU 100 cancels exerting the brake hold control.

In the present embodiment, while brake hold control is exerted, until an actual value of a degree of operation of an accelerator pedal exceeds degree A(0) as predetermined, the brake hold control is continued and a braking force is held. As such, exerting the brake hold control, with a controlled value of the degree of operation of the accelerator pedal set at the same value as the actual value of the degree of operation of the accelerator pedal, and driving motor 30 to generate a creep torque, will wastefully consume energy. Furthermore, when the actual value of the degree of operation of the accelerator pedal attains predetermined degree A(0) and the brake hold control is accordingly cancelled, with the controlled value of the degree of operation of the accelerator pedal set at the same value as the actual value of the degree of operation of the accelerator pedal (i.e., predetermined degree A(0)), a driving force of a magnitude corresponding to predetermined degree A(0) has already been output, and the vehicle may suddenly start.

Accordingly, the present embodiment provides a control device to set a controlled value of a degree of operation of the accelerator pedal such that while the brake hold control is exerted the controlled value of the degree of operation of the accelerator pedal is zero and when the actual value of the degree of operation of the accelerator pedal has attained predetermined degree A(0) the controlled value of the degree of operation of the accelerator pedal is gradually converged to the actual value of the degree of operation of the accelerator pedal.

Figure 3:
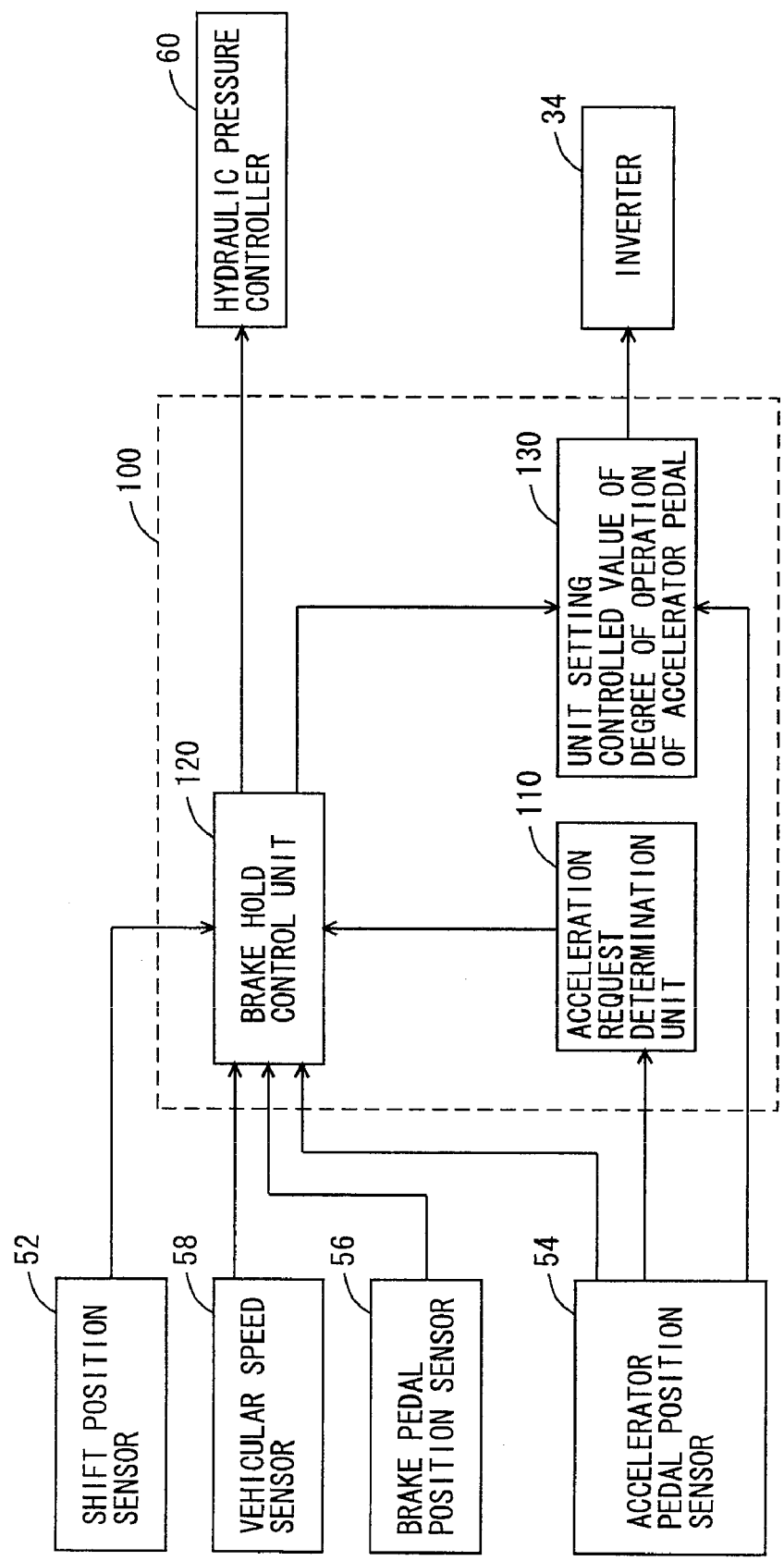
FIG. 3 is a block diagram in function of the control device of the present invention in the first embodiment.

FIG. 3 is a block diagram in function of the control device in the present embodiment. As shown in FIG. 3, the control device includes an acceleration request determination unit 110, a brake hold control unit 120 connected to acceleration request determination unit 110, and a unit 130 connected to brake hold control unit 120 and setting a controlled value of a degree of operation of the accelerator pedal.

Acceleration request determination unit 110 receives an actual value of a degree of operation of the accelerator pedal from accelerator pedal position sensor 54 and determines therefrom whether the driver currently requests acceleration.

Brake hold control unit 120 receives shift position SP from shift position sensor 52, an amount of operation of the brake pedal from brake pedal position sensor 56, vehicular speed V from vehicular speed sensor 58, and a decision made by acceleration request determination unit 110, and outputs in accordance therewith a command signal to a hydraulic pressure controller 60 to exert/cancel the brake hold control.

Unit 130 setting a controlled value of a degree of operation of the accelerator pedal receives the actual value of the degree of operation of the accelerator pedal and the command signal from accelerator pedal position sensor 54 and brake hold control unit 120, respectively, sets a controlled value of the degree of operation of the accelerator pedal in accordance therewith, and outputs a command signal to inverter 34 to cause motor 30 to output a torque corresponding to the set, controlled value of the degree of operation of the accelerator pedal.

The control device having such a function block according to the present embodiment can also be implemented by hardware mainly of a configuration of a digital circuit, an analog circuit and the like, or software mainly of CPU 102 and ROM 104 included in ECU 100 and a program read from ROM 104 and executed by CPU 102. In general, it is said that the control device implemented by hardware is advantageous in speed of operation and that the control device implemented by software is advantageous in changing a design. Hereinafter will be described a control device implemented as software. Note that a storage medium having such a program stored therein is also a manner of the present invention.

Figure 4:
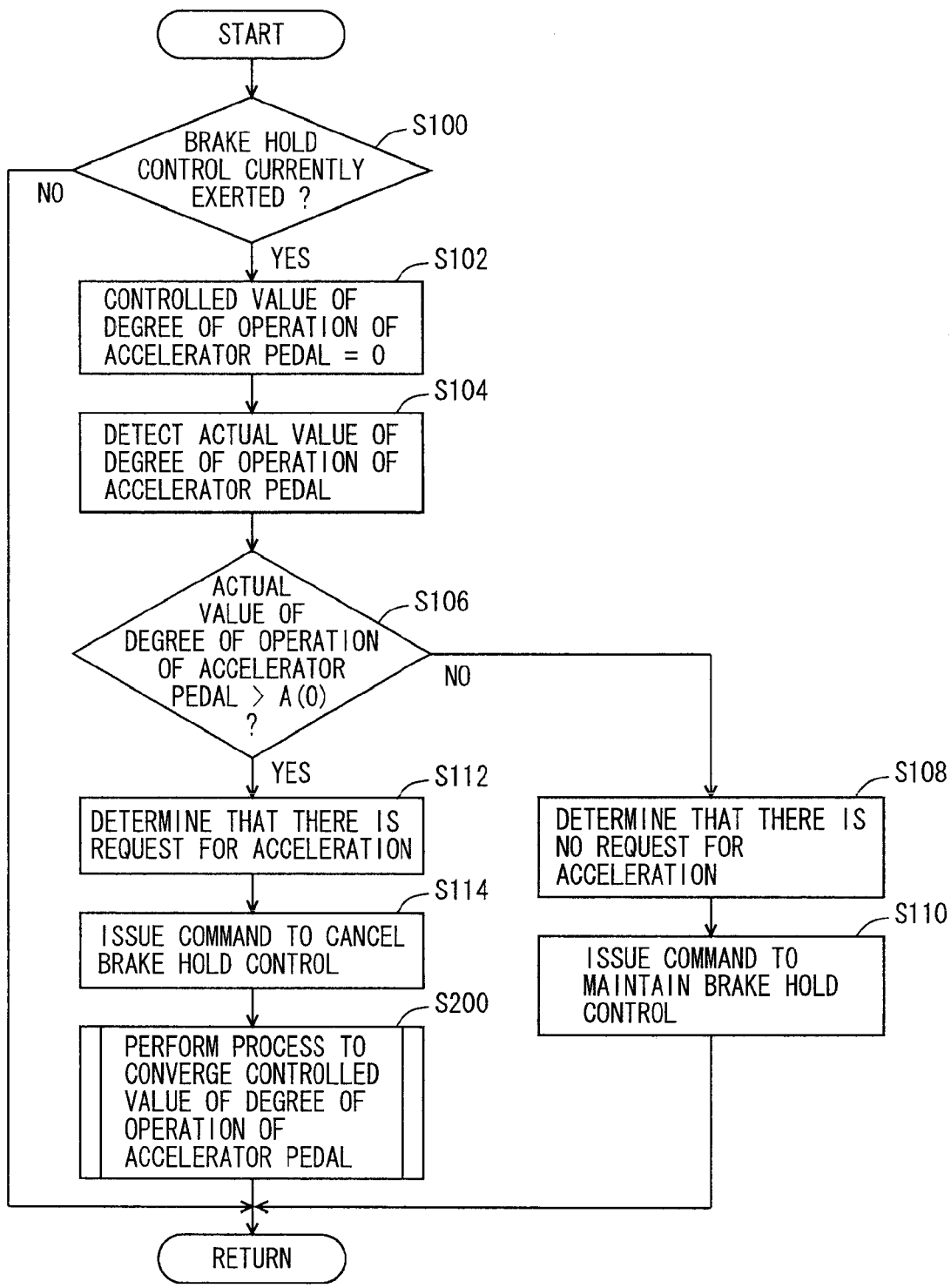
FIGS. 4 and 5 are flowcharts for illustrating a structure of an ECU serving as the control device of the present invention in the first embodiment for control.

With reference to FIG. 4, the control device according to the present embodiment, or ECU 100, executes a program having a structure for control, as will be described hereinafter. Note that this program is repeatedly executed at a predetermined cycle time.

In step (S) 100, ECU 100 determines whether the brake hold control is currently exerted. If so (YES in S100), the control proceeds to S102. Otherwise (NO in S100), the process ends.

In S102, ECU 100 sets a controlled value of a degree of operation of the accelerator pedal at 0. In S104, ECU 100 detects the actual value of the degree of operation of the accelerator pedal in accordance with a signal received from accelerator pedal position sensor 54.

In S106, ECU 100 determines whether the actual value of the degree of operation of the accelerator pedal is larger than predetermined degree A(0). As has been described previously, predetermined degree A(0) is a value that allows a decision to be made that accelerator pedal position sensor 54 normally functions and that can ensure the driver's request for acceleration in reliability. If the actual value of the degree of operation of the accelerator pedal is larger than predetermined degree A(0) (YES in S106), the control proceeds to S112. Otherwise (NO in S106), the control proceeds to S108.

In S108, ECU 100 determines that there is no request from the driver for acceleration. In S110, ECU 100 outputs a command to hydraulic pressure controller 68 to maintain the brake hold control.

In S112, ECU 100 determines that there is a request from the driver for acceleration. In S114, ECU 100 outputs a command to hydraulic pressure controller 68 to cancel the brake hold control. In S200, ECU 100 performs a process to converge the controlled value of the degree of operation of the accelerator pedal.

Figure 5:
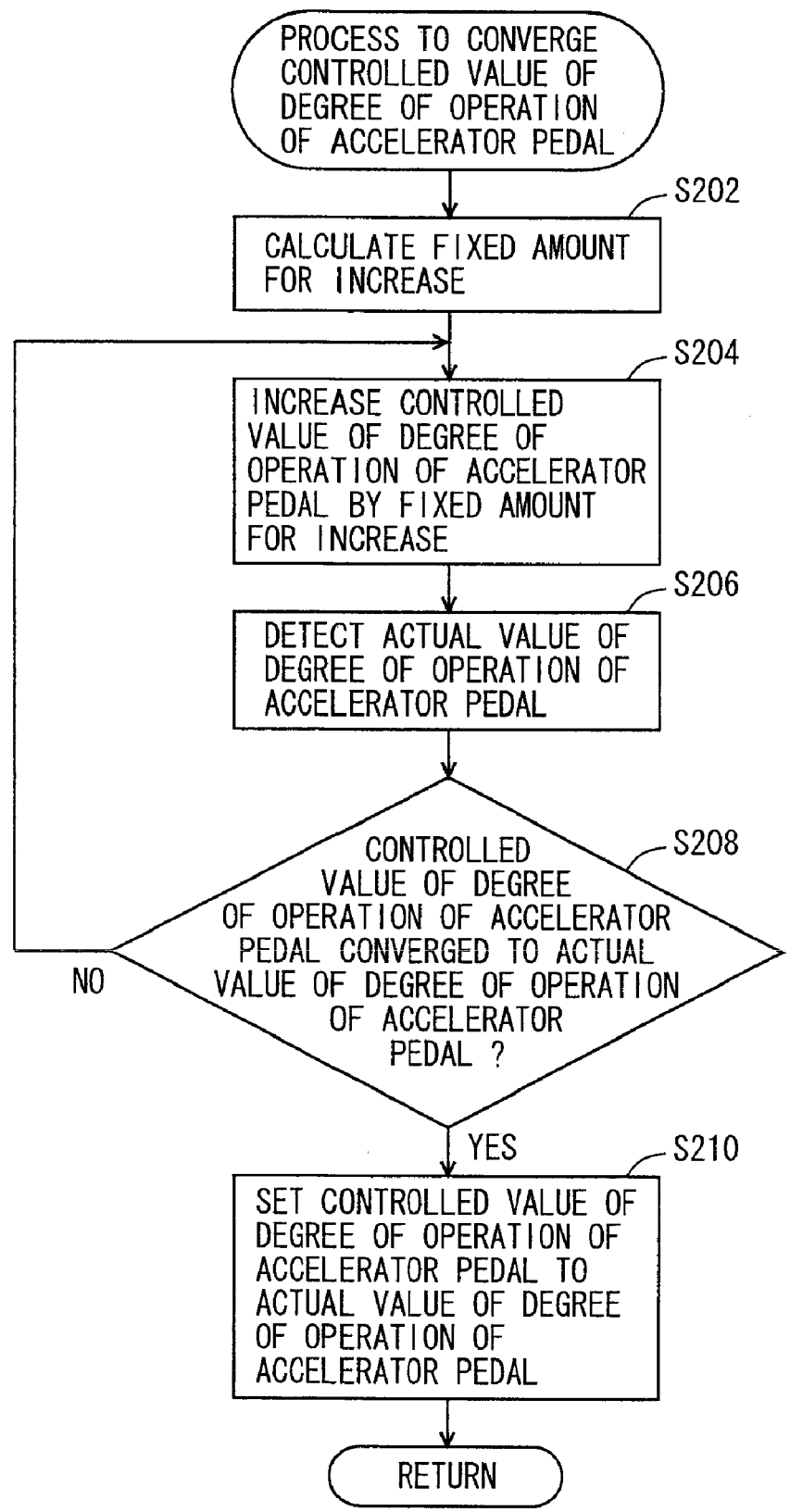

With reference to FIG. 5, the control device according to the present embodiment, or ECU 100, performs the process to converge the controlled value of the degree of operation of the accelerator pedal by executing a program having a structure for control, as will be described hereinafter.

In S202, ECU 100 calculates a fixed amount for increase. ECU 100 calculates the fixed amount for increase so that a difference that an actual value of a degree of operation of the accelerator pedal and a controlled value of the degree of operation of the accelerator pedal have therebetween when the brake hold control is cancelled is converged in a predetermined period of time. More specifically, ECU 100 divides predetermined degree A(0) by the predetermined period of time to obtain the fixed amount for increase. The fixed amount for increase may previously be stored.

In S204, ECU 100 increases the controlled value of the degree of operation of the accelerator pedal by the fixed amount for increase. In S206, ECU 100 detects the actual value of the degree of operation of the accelerator pedal in accordance with a signal received from accelerator pedal position sensor 54.

In S208, ECU 100 determines whether the controlled value of the degree of operation of the accelerator pedal has converged to the actual value of the degree of operation of the accelerator pedal. ECU 100 determines that the former value has converged to the latter value if the values have a difference having a predetermined value or smaller. If ECU 100 determines that the former value has converged to the latter value (YES in S208), the control proceeds to S210. Otherwise (NO in S208), the control returns to S204. In S210, ECU 100 sets the former value to the latter value.

In accordance with the above structure and flowchart, the control device according to the present embodiment, or ECU 100, controls electric vehicle 20 to operate, as will be described hereinafter.

Figure 6:
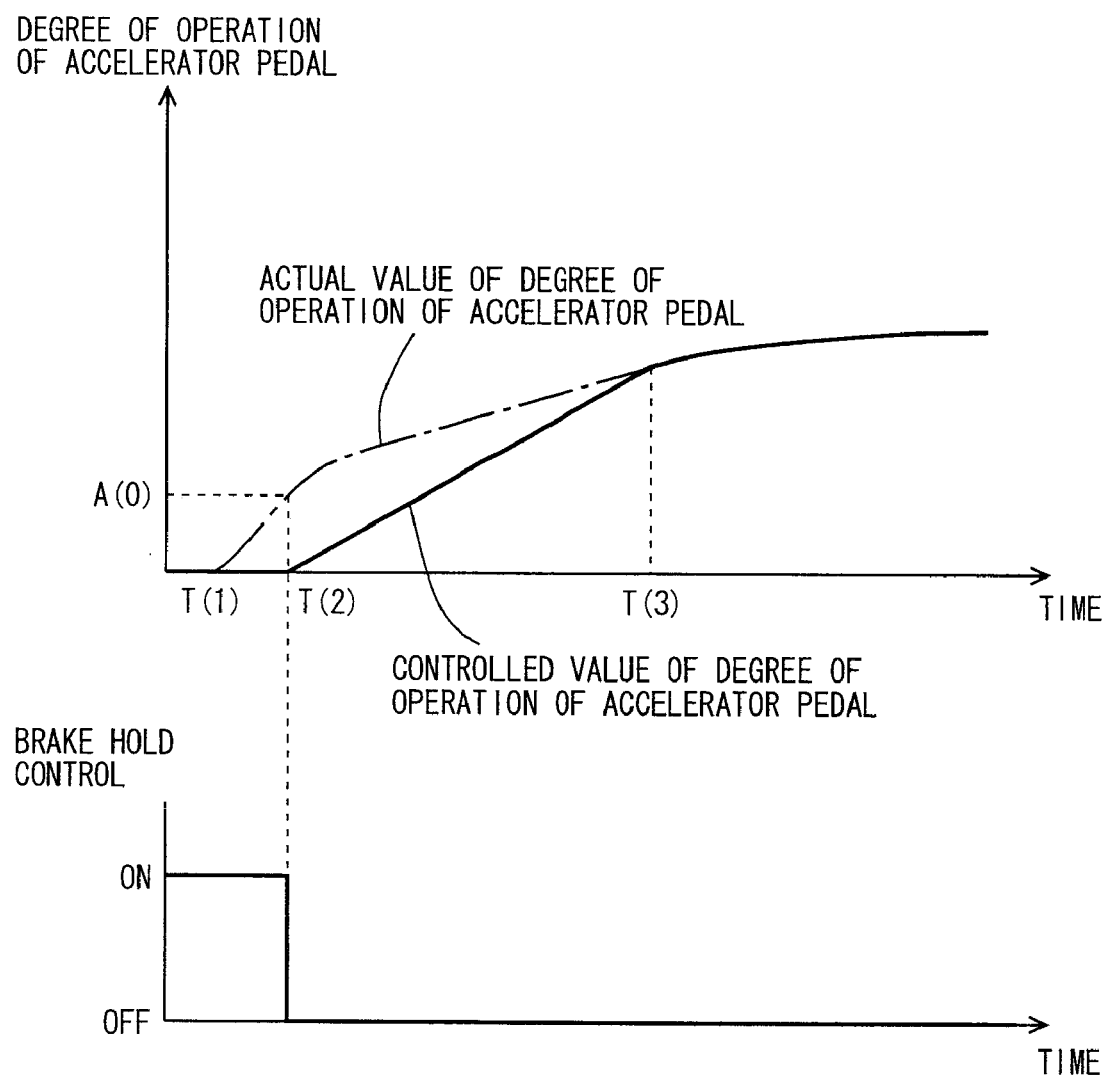
FIG. 6 is timing plots representing a degree of operation of an accelerator pedal in a vehicle having mounted therein the control device of the present invention in the first embodiment.

As shown in FIG. 6, while the brake hold control is exerted (YES in S100), an actual value of a degree of operation of the accelerator pedal starts to increase at time T(1) for the sake of illustration.

Before the actual value of the degree of operation of the accelerator pedal attains predetermined degree A(0), i.e., before time T(2) (NO in S106), whether accelerator pedal position sensor 54 normally functions cannot be determined, and the driver's request for acceleration cannot be ensured in reliability. Accordingly, a controlled value of the degree of operation of the accelerator pedal is set at 0 (S102) and a decision is also made that there is no request from the driver for acceleration (S108), and the brake hold control is maintained (S110). The brake hold control can thus be exerted without motor 30 driven to wastefully consume electric power.

At time T(2) the actual value of the degree of operation of the accelerator pedal increases to predetermined degree A(0) (YES in S106), and accordingly, a decision is made that there is a request from the driver for acceleration (S112), and as shown in FIG. 6, the brake hold control is cancelled (S114).

Furthermore, until the controlled value of the degree of operation of the accelerator pedal converges to the actual value of the degree of operation of the accelerator pedal, the controlled value of the degree of operation of the accelerator pedal is gradually increased in a fixed amount for increase (NO in S204, S208). In comparison with a case with a controlled value of a degree of operation of the accelerator pedal set at the same value as an actual value of the degree of operation of the accelerator pedal at time T(2), motor 30 can output a gradually increasing torque, and the vehicle can be prevented from suddenly starting.

At time T(3) the controlled value of the degree of operation of the accelerator pedal converges to the actual value of the degree of operation of the accelerator pedal (YES in S208), and the former is set to the latter (S210). The driver's request for acceleration and the output of motor 30 can thus be matched.

Thus the present embodiment provides a control device such that before an actual value of a degree of operation of an accelerator pedal attains a predetermined degree a decision is made that there is no request from the driver for acceleration, and the brake hold control is maintained and a controlled value of the degree of operation of the accelerator pedal is set at 0. The brake hold control can thus be exerted without a motor driven to wastefully consume electric power. When the actual value of the degree of operation of the accelerator pedal has attained the predetermined degree, a decision is made that there is a request from the driver for acceleration, and the brake hold control is cancelled. In doing so, before the controlled value of the degree of operation of the accelerator pedal converges to the actual value of the degree of operation of the accelerator pedal, the controlled value of the degree of operation of the accelerator pedal is gradually increased in a fixed amount for increase. The motor can thus output a gradually increasing torque, and the vehicle can be prevented from suddenly starting when the brake hold control is cancelled.

While the present embodiment has been described with a controlled value of a degree of operation of an accelerator pedal set at 0 during brake hold control, the controlled value of the degree of operation of the accelerator pedal is not limited to 0 as long as it is set at a value smaller than the actual value of the degree of operation of the accelerator pedal.

Second Embodiment

A second embodiment provides a control device, as will be described hereinafter. The control device according to the present embodiment is mounted in an electric vehicle which is different from electric vehicle 20 of the first embodiment only in that ECU 100 executes a program having a different structure for control. The remainder in configuration is identical to electric vehicle 20 of the first embodiment. Identical configurations are identically denoted. Their names and functions are also identical. Accordingly, they will not be described repeatedly in detail.

Figure 7:
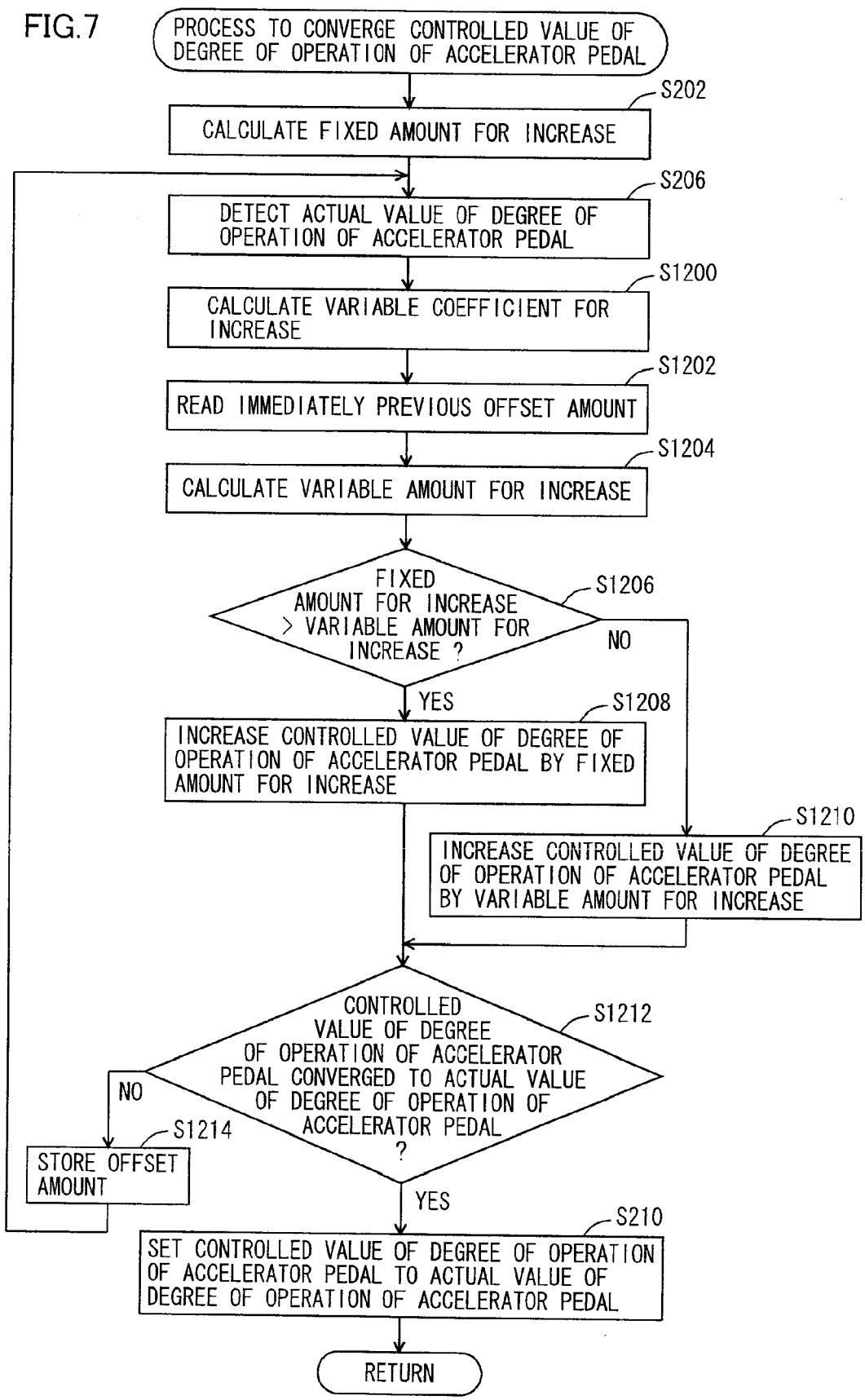
FIG. 7 is a flowchart for illustrating a structure of an ECU serving as the control device of the present invention in a second embodiment for control.

With reference to FIG. 7, the control device according to the present embodiment, or ECU 100, performs a process to converge a controlled value of a degree of operation of an accelerator pedal by executing a program having a structure for control, as will be described hereinafter. In the FIG. 7 flowchart the steps identical to those in the FIG. 5 flowchart are identically denoted and will not be described repeatedly in detail.

Figure 8:
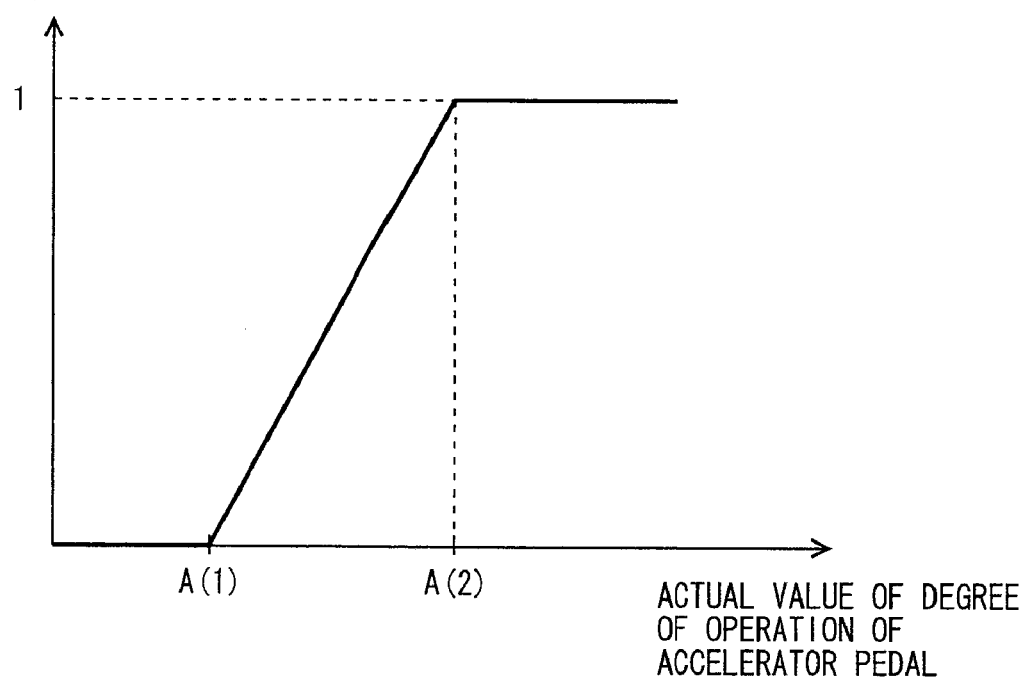
FIG. 8 represents a relationship between an actual value of a degree of operation of an accelerator pedal and a variable coefficient for increase for a controlled value of the degree of operation of the accelerator pedal.

In S1200, ECU 100 receives an actual value of a degree of operation of an accelerator pedal from accelerator pedal position sensor 54 and therefrom calculates a variable coefficient for increase. The variable coefficient for increase is used to calculate an amount of a controlled value of the degree of operation of the accelerator pedal that should be increased. ECU 100 calculates the variable coefficient for increase, for example as based on a map with the actual value of the degree of operation of the accelerator pedal serving as a parameter. In this map, as shown in FIG. 8, for an actual value of a degree of operation of the accelerator pedal smaller than A(1), a variable coefficient for increase is calculated as 0. As the actual value of the degree of operation of the accelerator pedal is increased to have values larger than A(1), the variable coefficient for increase is calculated to increase to be gradually larger, and for an actual value of the degree of operation of the accelerator pedal larger than A(2), the variable coefficient for increase is calculated as 1. However, how the variable coefficient for increase is calculated is not limited to the above.

In S1202, ECU 100 reads an offset amount (a difference between a controlled value of a degree of operation of the accelerator pedal and an actual value of the degree of operation of the accelerator pedal) that was stored when the present program was immediately previously executed.

In S1204, ECU 100 calculates a variable amount for increase. ECU 100 for example calculates a product of the read, previous offset amount and the calculated, variable coefficient for increase as the variable amount for increase.

In S1206, ECU 100 determines whether a fixed amount for increase is larger than the variable amount for increase. If so (YES in step S1206), the control proceeds to S1208. Otherwise (NO in step S1206), the control proceeds to S1210.

In S1208, ECU 100 increases the controlled value of the degree of operation of the accelerator pedal by the fixed amount for increase. In S1210, ECU 100 increases the controlled value of the degree of operation of the accelerator pedal by the variable amount for increase.

In S1212, ECU 100 determines whether the controlled value of the degree of operation of the accelerator pedal has converged to the actual value of the degree of operation of the accelerator pedal. ECU 100 determines that the former value has converged to the latter value if the values have a difference having a predetermined value or smaller. If ECU 100 determines that the former value has converged to the latter value (YES in step S1212), the control proceeds to S210. Otherwise (NO in step S1212), the control proceeds to S1214.

In S1214, ECU 100 stores the difference between the controlled value of the degree of operation of the accelerator pedal and the actual value of the degree of operation of the accelerator pedal as an offset amount.

In accordance with the above structure and flowchart, the control device according to the present embodiment, or an ECU, controls an electric vehicle to operate, as will be described hereinafter.

Figure 9:
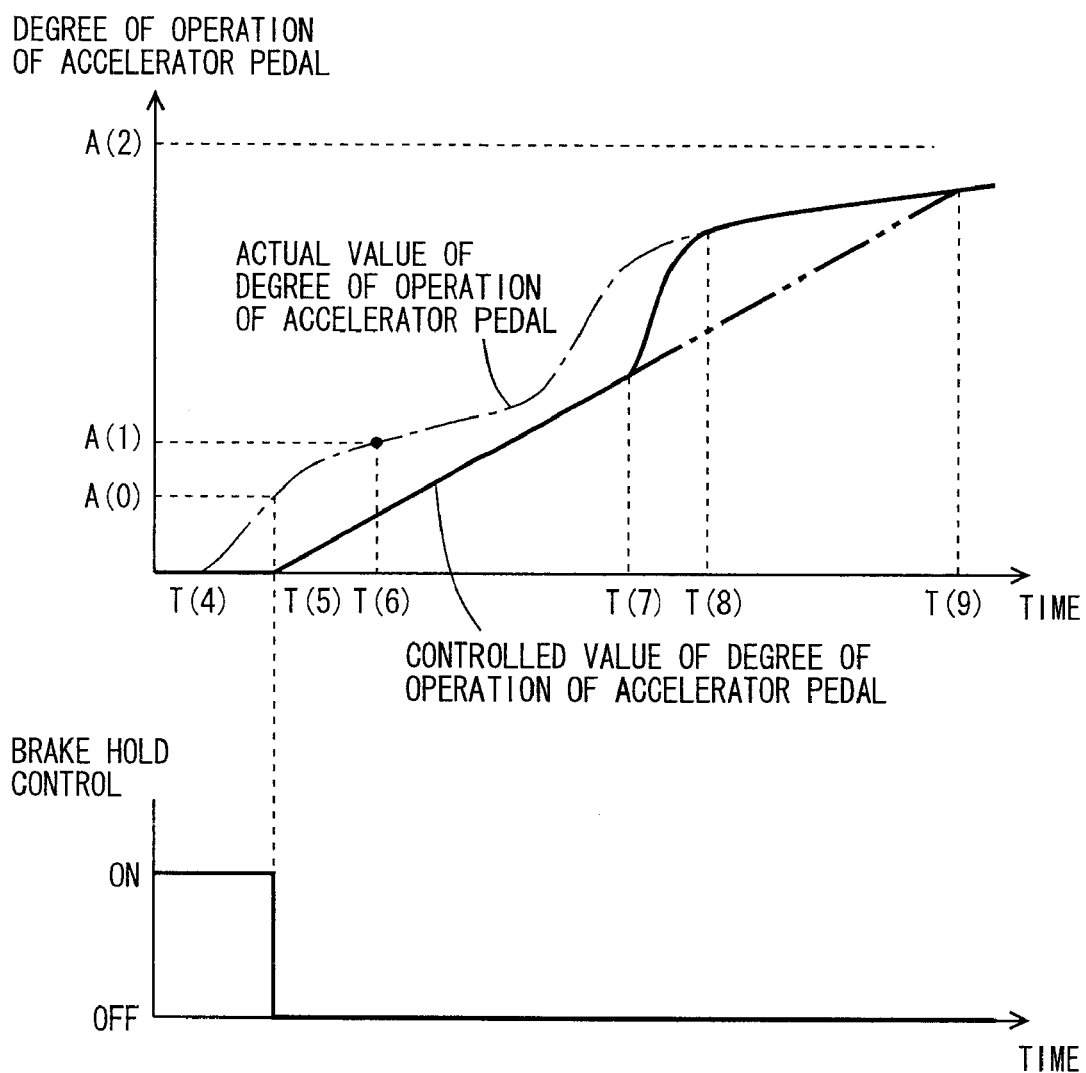
FIG. 9 is timing plots representing a degree of operation of an accelerator pedal in a vehicle having mounted therein the control device of the present invention in the second embodiment.

As shown in FIG. 9, while the brake hold control is exerted (YES in S100), an actual value of a degree of operation of the accelerator pedal starts to increase at time T(4) for the sake of illustration.

During the brake hold control (YES in S100) before the actual value of the degree of operation of the accelerator pedal attains predetermined degree A(0), i.e., before time T(5) (NO in S106), a controlled value of the degree of operation of the accelerator pedal is set at 0 (S102) and a decision is also made that there is no request from the driver for acceleration (S108), and the brake hold control is maintained (S110), similarly as done in the first embodiment. The brake hold control can thus be exerted without motor 30 driven to wastefully consume electric power.

At time T(5) the actual value of the degree of operation of the accelerator pedal increases to predetermined degree A(0) (YES in S106), and accordingly, a decision is made that there is a request from the driver for acceleration (S112), and as shown in FIG. 9, the brake hold control is cancelled (S114).

Herein, the controlled value of the degree of operation of the accelerator pedal is increased in the larger one of the fixed amount for increase and the variable amount for increase (S126, S1208, S1210). Note that in FIG. 9, the actual value of the degree of operation of the accelerator pedal attains A(1) at time T(6) and the variable coefficient for increase is calculated as a value equal to or larger than 0 (S1200), and as the actual value of the degree of operation of the accelerator pedal increases, the variable amount for increase is larger than the fixed amount for increase at time T(7). While a controlled value of a degree of operation of the accelerator pedal that is increased only in the fixed amount for increase (see a chain double-dashed line in FIG. 9) converges to the actual value of the degree of operation of the accelerator pedal at time T(9), the controlled value of the degree of operation of the accelerator pedal that is increased with the variable amount for increase also introduced can be converged to the actual value of the degree of operation of the accelerator pedal in a shorter period of time, or at time T(8).

Furthermore, the variable amount for increase is calculated as a product of the immediately previous offset amount and the variable coefficient for increase (S1204), and for larger offset amounts, the variable amount for increase can be larger to faster converge the controlled value of the degree of operation of the accelerator pedal to the actual value of the degree of operation of the accelerator pedal, and motor 30 can hence faster output a driving force corresponding to the driver's request for acceleration.

Furthermore, the variable coefficient for increase is set to have a larger value for a larger actual value of a degree of operation of the accelerator pedal (see FIG. 8). Thus for a larger actual value of a degree of operation of the accelerator pedal and a request from a driver for larger acceleration the variable amount for increase can be larger to faster converge a controlled value of the degree of operation of the accelerator pedal to the actual value of the degree of operation of the accelerator pedal. Motor 30 can thus faster output a driving force corresponding to the driver's request for acceleration.

Thus the present embodiment provides a control device such that before an actual value of a degree of operation of an accelerator pedal attains a predetermined degree a decision is made that there is no request from a driver for acceleration, and brake hold control is maintained and a controlled value of the degree of operation of the accelerator pedal is set at 0. The brake hold control can thus be exerted without a motor driven to wastefully consume electric power. When the actual value of the degree of operation of the accelerator pedal has attained the predetermined degree, a decision is made that there is a request from the driver for acceleration, and the brake hold control is cancelled. In doing so, the controlled value of the degree of operation of the accelerator pedal is increased in the larger one of a fixed amount for increase and a variable amount for increase calculated based on the actual value of the degree of operation of the accelerator pedal and a difference from the actual value of the degree of operation of the accelerator pedal. Thus, the controlled value of the degree of operation of the accelerator pedal can be gradually increased to prevent a vehicle from suddenly starting when the brake hold control is cancelled, and a motor can fast output a driving force corresponding to the driver's request for acceleration.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

The invention claimed is:

1. A vehicular control device for a vehicle subjected to brake hold control controlling a braking device to hold a force braking said vehicle, as based on a state of said vehicle, while a driver of said vehicle does not press a brake pedal, the control device comprising:
   a detection unit that detects a first degree as an actual value of a degree of a request made by said driver for acceleration;
   a degree setting unit that sets a second degree used as a controlled value of said degree of said request made by said driver for acceleration, to control a force output to drive said vehicle; and
   a control unit that controls said force output to drive said vehicle, as based on said second degree, said degree setting unit including
      a determination unit that determines whether said first degree is larger than said predetermined degree while said brake hold control is exerted,
      a setting unit that sets said second degree to be smaller than said first degree until a decision is made that said first degree is larger than said predetermined degree,
      a stopping unit that stops said brake hold control when a decision is made that said first degree is larger than said predetermined degree, and
      an increasing unit that increases said second degree to gradually approach said first degree after said stopping unit stops said brake hold control.

2. The vehicular control device according to claim 1, wherein said increasing unit increases said second degree based on a difference between said first degree and said second degree.

3. The vehicular control device according to claim 2, wherein said increasing unit increases said second degree at a rate allowing an amount increased for a predetermined time to be equal to said difference that is provided when said brake hold control is stopped.

4. The vehicular control device according to claim 2, wherein said increasing unit increases said second degree by a larger amount for said difference that is larger.

5. The vehicular control device according to claim 1, wherein said increasing unit increases said second degree based on said first degree.

6. The vehicular control device according to claim 5, wherein said increasing unit increases said second degree by a larger amount for said first degree that is larger.

7. A vehicular control device for a vehicle subjected to brake hold control controlling a braking device to hold a force braking said vehicle, as based on a state of said vehicle, while a driver of said vehicle does not press a brake pedal, the control device comprising:

means for detecting a first degree as an actual value of a degree of a request made by said driver for acceleration;

means for setting a second degree used as a controlled value of said degree of said request made by said driver for acceleration, to control a force output to drive said vehicle; and means for controlling said force output to drive said vehicle, as based on said second degree, said means for setting comprising:

means for determining whether said first degree is larger than a predetermined degree while said brake hold control is exerted, means for setting said second degree to be smaller than said first degree until a decision is made that said first degree is larger than said predetermined degree, and means for stopping said brake hold control when a decision is made that said first degree is larger than said predetermined degree, and means for increasing said second degree to gradually approach said first degree after said means for stopping stops said brake hold control.

8. The vehicular control device according to claim 7, wherein said means for increasing includes means for increasing said second degree based on a difference between said first degree and said second degree.

9. The vehicular control device according to claim 8, wherein said means for increasing includes means for increasing said second degree at a rate allowing an amount increased for a predetermined time to be equal to said difference that is provided when said brake hold control is stopped.

10. The vehicular control device according to claim 8, wherein said means for increasing includes means for increasing said second degree by a larger amount for said difference that is larger.

11. The vehicular control device according to claim 7, wherein said means for increasing includes means for increasing said second degree based on said first degree.

12. The vehicular control device according to claim 11, wherein said means for increasing includes means for increasing said second degree by a larger amount for said first degree that is larger.

13. A method performed by a vehicular control device to control a vehicle subjected to brake hold control controlling a braking device to hold a force braking said vehicle, as based on a state of said vehicle, while a driver of said vehicle does not press a brake pedal, the method comprising:

detecting, by said control device, a first degree as an actual value of a degree of a request made by said driver for acceleration;

setting, by said control device, a second degree used as a controlled value of said degree of said request made by said driver for acceleration, to control a force output to drive said vehicle; and controlling, by said control device, said force output to drive said vehicle, as based on said second degree, the step of setting comprising:

determining, by said control device, whether said first degree is larger than a predetermined degree while said brake hold control is exerted, setting, by said control device, said second degree to be smaller than said first degree until a decision is made that said first degree is larger than said predetermined degree, said control device stopping said brake hold control when a decision is made that said first degree is larger than said predetermined degree, and said control device increasing said second degree to gradually approach said first degree after said brake hold control is stopped in the step of stopping.

14. The method of controlling a vehicle according to claim 13, wherein the step of increasing includes the step of increasing, by said control device, said second degree based on a difference between said first degree and said second degree.

15. The method of controlling a vehicle according to claim 14, wherein the step of increasing includes the step of increasing, by said control device, said second degree at a rate allowing an amount increased for a predetermined time to be equal to said difference that is provided when said brake hold control is stopped.

16. The method of controlling a vehicle according to claim 14, wherein the step of increasing includes the step of increasing, by said control device, said second degree by a larger amount for said difference that is larger.

17. The method of controlling a vehicle according to claim 13, wherein the step of increasing includes the step of increasing, by said control device, said second degree based on said first degree.

18. The method of controlling a vehicle according to claim 17, wherein the step of increasing includes the step of increasing, by said control device, said second degree by a larger amount for said first degree that is larger.

19. A storage medium having a program stored therein readably by a computer for causing said computer to perform the method recited in claim 13.

\* \* \* \* \*